United States Patent [19]

Grasso

[11] 4,344,850
[45] Aug. 17, 1982

[54] FUEL CELL POWER PLANT COOLANT CLEANING SYSTEM AND METHOD

[75] Inventor: Albert P. Grasso, Vernon, Conn.

[73] Assignee: United Technologies Corporation, Hartford, Conn.

[21] Appl. No.: 226,266

[22] Filed: Jan. 19, 1981

[51] Int. Cl.³ ............................ C02F 1/20; C02F 1/28
[52] U.S. Cl. .................................. 210/664; 210/167; 210/182; 429/17; 429/20
[58] Field of Search ............... 210/662, 664, 669, 805, 210/97, 143, 167, 180–182, 259, 266, 284, 295; 429/17, 19, 20

[56] References Cited

U.S. PATENT DOCUMENTS 3,982,962  9/1976  Bloomfield ........................... 429/19
4,120,787 10/1978  Yargeau ............................... 210/664

Primary Examiner—Ivars C. Cintins
Attorney, Agent, or Firm—Stephen E. Revis

[57] ABSTRACT

In a process for deaerating and purifying both the water which is recirculated in a coolant loop through a stack of fuel cells and the make-up water for the coolant loop, a portion of the water from the coolant loop is blown down into a deaerator water reservoir to which make-up water is added as required by the coolant loop. Water is withdrawn from the reservoir, purified, and then introduced into the coolant loop at a rate sufficient to maintain the desired amount of water circulating in the coolant loop. The blowdown provides some of the heat for deaerating the water; and the rate of blowdown flow into the reservoir is sufficient to maintain an acceptable level of impurities in the recirculating coolant loop water. Preferably, the blowdown flow rate is controlled as a function of the amount of make-up water required to be added to the coolant loop.

4 Claims, 1 Drawing Figure

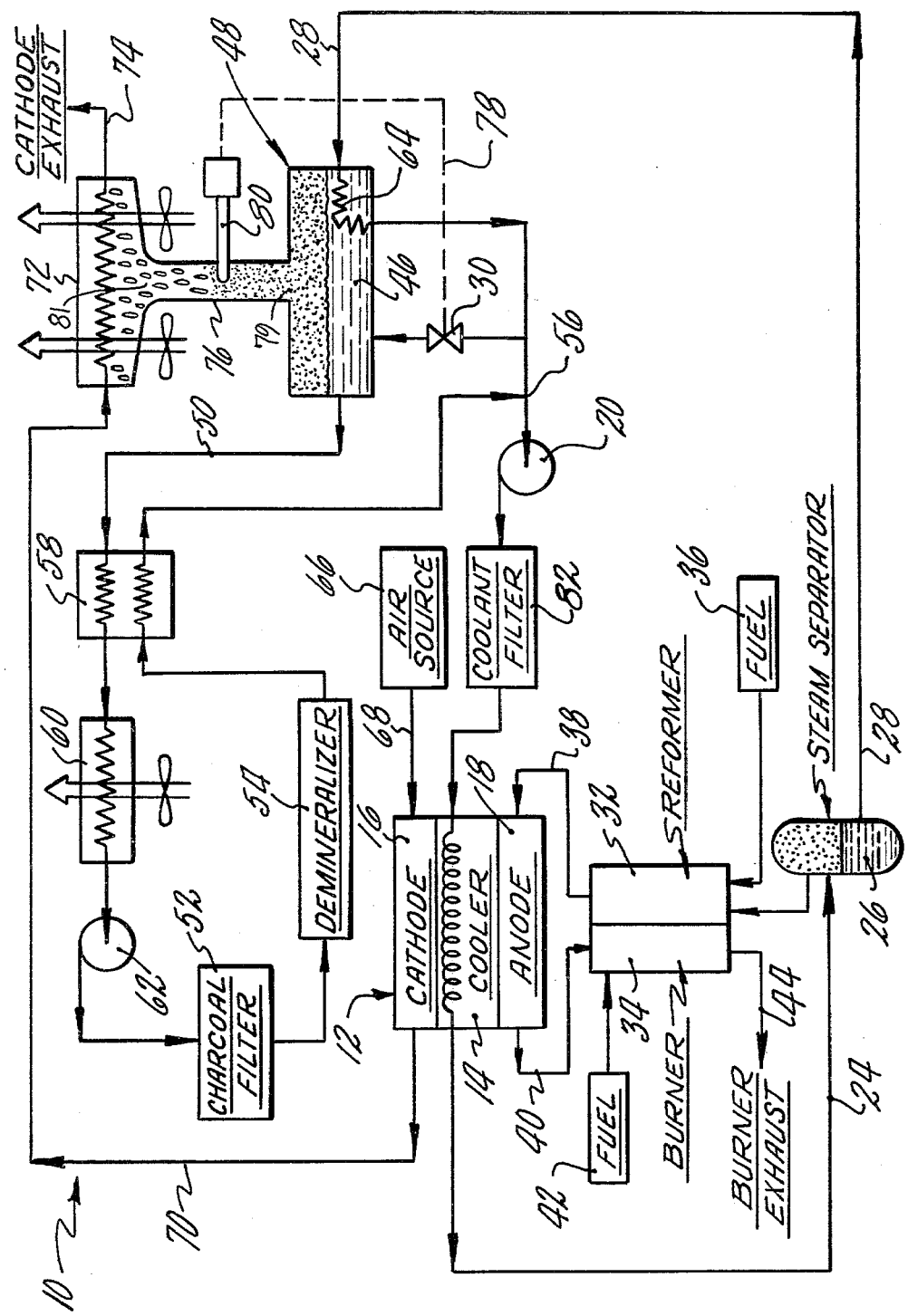

FUEL CELL POWER PLANT COOLANT CLEANING SYSTEM AND METHOD

TECHNICAL FIELD

This invention relates to coolant systems, and more particularly to maintaining a coolant free from impurities.

BACKGROUND ART

Many industrial operations utilize apparatus which generates a considerable amount of heat; and this heat is often removed by circulating a coolant into heat exchange relationship with the heat source. In some operations, after the coolant is heated by the heat source it is cooled nd recirculated. The extracted heat may or may not be utilized.

In many systems which utilize water as the coolant, the water is required to have a low level of dissolved gases and dissolved and suspended solid particles. Dissolved gases are typically removed by deaerating the water. Solids may be removed by suitable filters and other devices of a type which depends uponthe nature and size of the impurities and the extent to which they must be removed. Even if acceptably clean water is initially introduced into the system, it may pick up or accumulate contaminants from within the system, and these contaminants often have to be removed on either an intermittent or continuing basis.

Boilers or other apparatus that include a reservoir which remains at least partially filled with hot water may also accumulate unacceptably large amounts of impurities with time. Intermittent blowdown of these reservoirs to remove the accumulated impurities is well known in the art. For example, in U.S. Pat. No. 3,215,126 steam is used to drive a turbine. The turbine exhaust is condensed and the water therefrom is deaerated. The deaerated water is passed through a heat source whereupon at least a portion of it is converted to steam. The heated water and steam is then sent to a steam drum which includes a reservoir of liquid water maintained at saturated temperature. The steam is used to drive the turbine and the liquid in the steam drum is blown down intermittently to remove impurities which build up therein. The blowdown is shown being fed to the deaerator. Other U.S. patents which show the use of filters, deaerators, and blowdown to remove contaminants include the following U.S. Pat. Nos. 1,543,727; 1,895,635; 1,904,900; 2,001,249; 2,018,803; 2,193,795; 2,258,167; 3,200,568; and 3,668,838.

In commonly owned U.S. Pat. No. 3,982,962, FIG. 1 shows a fuel cell power plant wherein water is continuously circulated and recirculated through the fuel cells as a coolant therefor. Heat from the cells converts a portion of the coolant to steam, and that steam is used in a steam reform reactor to produce hydrogen fuel for the fuel cells. Make-up water for the coolant loop is obtained by condensing water from the fuel cell reactant gas streams. The coolant water picks up impurities as it recirculates through the system and also from the impurities in the make-up water added thereto. It is desirable to both remove impurities from the make-up water before adding it to the recirculating coolant, and to remove impurities as they build up in the recirculating coolant loop. Commonly owned U.S. Pat. No. 4,120,787 describes a system for deaerating and purifying the condensate from fuel cell reactant gas exhaust streams; however, an efficient, economical method for both cleaning the condensate as well as maintaining the purity of a continuously recirculating coolant is presently not described in the art.

DISCLOSURE OF INVENTION

One object of the present invention is an efficient and economical coolant water cleaning system.

A more specific object of the present invention is a water deaerating and purifying system for the coolant water of a fuel cell power plant wherein recirculating coolant water and make-up water therefor is deaerated and purified with a minimum amount of apparatus.

According to the present invention deaerated water from a deaerator reservoir is cleaned of impurities and added as make-up water to water being recirculated as a coolant through a stack of fuel cells, wherein the recirculating water is cleaned of accumulating impurities by blowing down a portion thereof into the deaerator reservoir during recirculation.

In a preferred embodiment recirculating cooling water in a coolant loop is used to cool a stack of fuel cells in a fuel cell power plant. The cooling water is heated by the fuel cells and at least partially converted to steam. The steam in the coolant loop is separated from the liquid and some or all of it may be used elsewhere in the power plant. Hot blowdown from the coolant loop is fed to a water reservoir in a deaerator and provides at least some of the heat for deaeration. Make-up water to replace the used steam is also supplied to the deaerator reservoir and is deaerated along with the blowdown. Deaerated make-up water from the reservoir, in sufficient quantities to maintain the desired amount of water in the coolant loop, is purified to remove dissolved and suspended solids before it is added to the coolant loop. Most preferably the make-up water supplied to the deaerator water reservoir is obtained by condensing water from the fuel cell stack reactant gas streams, and the steam generated in the coolant loop is used in a steam reform reactor to make hydrogen fuel for the fuel cells.

The cleaning system of this invention is highly advantageous in that the water purification apparatus cleans both the make-up water and the recirculating coolant without the necessity of having two separate purifying systems. Additionally, the size of the apparatus in the purifying system need only be large enough to handle the make-up water and only a fraction of the coolant loop flow (i.e., the blowdown).

In the fuel cell power plant discussed above, when a greater demand is placed on the fuel cells a greater amount of heat is generated. More steam is thereby produced and used by the power plant, and the amount of make-up water required increases. A blowdown control automatically increases the amount of blowdown introduced into the water reservoir as more make-up water is required. This increased blowdown flow rate supplies additional heat for deaerating the additional make-up water; and is also the mechanism for maintaining the purity of recirculating coolant water.

The foregoing and other objects, features and advantages of the present invention will become more apparent in the light of the following detailed description of preferred embodiments thereof as shown in the accompanying drawing.

BRIEF DESCRIPTION OF THE DRAWING

The sole FIGURE is a diagramatic representation of a fuel cell power plant incorporating the features of the present invention.

BEST MODE FOR CARRYING OUT THE INVENTION

As an exemplary embodiment of the present invention consider the power plant 10 shown schematically in the drawing. This power plant is a fuel cell power plant wherein electricity is generated electrochemically in stacks of fuel cells connected electrically in parallel and/or series. Heat is generated within the stack of cells as a result of the electrochemical reaction; and this heat must be removed to maintain the cells at an acceptable operating temperature. One method for cooling the cells of a stack is to pass a cooling fluid into heat exchange relationship with the stack. This may be accomplished in a variety of ways such as shown in commonly owned U.S. Pat. Nos. 3,964,930; 3,990,913; 4,157,327; and 4,233,369. In those patents coolers are disposed within a stack after every third or fourth cell in the stack. The coolers comprise passageways or tubes for carrying coolant through the stack.

Referring to the drawing, a stack of fuel cells is generally represented by the numeral 12 and includes a cooler 14. Although a plurality of fuel cells would be disposed on each side of the cooler, for the purposes of simplicity in explaining the present invention the block representing the stack 12 shows only a cathode electrode 16 of one cell disposed on one side of the cooler and an anode electrode 18 of another cell disposed on the other side of the cooler.

The coolant, which in this case is water, is recirculated through a coolant loop by a pump 20. The recirculating coolant passes through the cooler 14 of the stack 12 whereupon it is heated to boiling and is at least partially converted to steam. A conduit 24 carries the two-phase coolant to a steam separator 26. Although not shown, the heated coolant may be cooled somewhat before reaching the steam separator, such as by transferring some of its heat to other liquid or gas streams within the power plant, as is well known in the art. The liquid portion of the coolant water within the steam separator travels back to the pump 20 via a conduit 28 and is recirculated through the stack 12. A portion of the recirculating coolant may be blown down through a valve 30 whose function will be more fully explained hereinafter.

In this power plant hydrogen for the fuel cells is produced in a reformer 32. In the reformer 32 a hydrocarbon fuel plus steam are reacted catalytically to produce hydrogen. Heat for the reaction is provided by a reformer burner 34. The reformer 32 receives raw fuel from a source 36 and steam from the separator 26. The hydrogen produced is fed to the anodes 18 of the fuel cells via a conduit 38. Depleted anode exhaust, which contains some unused hydrogen, is fed to the reformer burner 34 via a conduit 40 along with sufficient raw fuel from a source 42 to provide the amount of heat needed by the reformer 32. Exhaust products leave the burner via a conduit 44. Make-up water for the coolant loop to replace the steam used in the reformer is obtained from a water reservoir 46 of a deaerator 48. The water in the reservoir 46 is deaerated to remove dissolved gases by boiling as will be explained further hereinafter.

A sufficient amount of deaerated water from the reservoir 46 to maintain the desired amount of water is the coolant loop is withdrawn from the reservoir 46 via a conduit 50 and is purified by passing it through a charcoal filter 52 and a demineralizer 54 before introducing it into the coolant loop at 56. The filter 52 and demineralizer 54 remove suspended and dissolved solids. Since the operable limit of the demineralizer 54 is only about 140° F., the temperature of the make-up water from the reservoir 46 is first lowered in a regenerative heat exchanger 58 and further lowered by means of a radiator 60. Some of the heat is recaptured in the heat exchanger 58 after the water has been demineralized. A pump 62 moves the water through this purification loop.

In addition to cleaning the make-up water by means of the purification loop, the recirculating water in the coolant loop must also be cleaned of impurities which accumulate with time. In the present invention this is accomplished by blowing down, either intermittently or continuously, a sufficient portion of the recirculating coolant water into the deaerator reservoir 46 via the blowdown valve 30. In this way a portion of the recirculating coolant will be circulated through the charcoal filter and demineralizer of the purification loop. Additionally, the blowdown serves as a heat source for deaeration of the water in the reservoir. A percentage of the water passing through the blowdown valve 30 will flash to steam due to a pressure differential across the valve as established by the operating temperature of the recirculating water in the coolant loop. The injection of steam into the reservoir 46 further aids in the deaeration process. Any additional heat needed by the deaerator may be obtained from any suitable source within the power plant, or even separate burner. In this embodiment the coolant loop is shown passing into heat exchange relationship with the water at 64 to provide some of the required heat. The injection of blowdown from the recirculating coolant water into the reservoir 46 eliminates the need for a second purification system (i.e., charcoal filter, demineralizer and attendant heat exchangers) within the coolant loop and is an efficient method for providing heat to the deaerator.

The water for the reservoir 46 may be obtained from any suitable source, such as an external water supply. Preferably the water is condensed from one or both of the fuel cell stack reactant gas streams. In this embodiment air is the oxidant for the fuel cells and is provided to the cathodes of the cells from an air source 66. The air source 66 may be a compressor driven by a turbine to provide pressurized air to the cells if the cells are designed to operate at greater than atmospheric pressure. This air enters the stack 12 via a conduit 68 and the moist cathode exhaust gases leave the stack 12 via a conduit 70. These gases are passed through a condenser 72. In the condenser 72 the gases are cooled such that the water vapor is converted to liquid. The drier cathode exhaust leaves the condenser 72 via a conduit 74. The condensed liquid falls by gravity into a vertically extending deaerator column 76 and thence into the reservoir 46 of the deaerator. A sufficient quantity of water can be obtained in this manner to make up for the steam extracted from the separator 26 and used in the reformer 32. As a greater demand is placed upon the stack 12, additional heat is generated by the cells. More steam is thereby generated in the coolant loop by the cell waste heat, and this increased quantity of steam is used in the reformer 32 to produce the additional quantity of hydrogen called for by the stack. A greater demand upon the stack also results in the production of additional water within the cells; and this additional water is removed from the cathode exhaust in the condenser 72 and is deaerated in the column 76 as it falls into the reservoir 46 for reintroduction into the coolant loop.

The greater the rate at which water is added to the reservoir 46, the greater the amount of heat required to deaerate this water. In the system of the present invention the amount of blowdown introduced into the reservoir via the valve 30 is a function of the rate at which make-up water is required to be added to the coolant loop. This provides the additional heat for deaeration. The valve 30 may be controlled, for example, as a function of the water level in the steam separator 26.

An exemplary method for controlling the blowdown is shown in the drawing of this application and is claimed in commonly owned, co-pending United States Patent Application Ser. No. 226,267 filed 1/19/81 titled "Fuel Cell Power Plant Self-Controlling Coolant Cleaning System" by A. Grasso and J. Lane, filed on even date herewith. Thus, the blowdown valve 30 is controlled by a temperature signal 78 from a temperature probe 80 which senses the temperature at a fixed location within the deaerating column 76 between its open lower end 79 above the water in the reservoir 46 and its upper open end 81 adjacent the condenser 72. Steam is being generated in the deaerator 48 at a rate which is a function of the amount of heat being added to the water in the reservoir 46. This steam rises into the deaerating column 76. As the steam moves up the column 76 it meets the cooler, falling condensate from the condenser 72 and is eventually itself condensed and falls back into the reservoir 46. It has been discovered that there is a rather definite steam/liquid interface within the column 76, below which the temperature drops off rather quickly towards condenser temperature. This steam liquid interface moves up and down the column depending upon the rate at which the water is being condensed into the column 76 from the condenser 72. The temperature probe 80 can readily sense when the steam/liquid interface passes by due to the sudden change in temperature. As more water is condensed due to a greater demand placed upon the stack 12, the steam/liquid interface is forced down the column 76. When the temperature probe 80 senses that the interface has passed, it opens the blowdown valve 30 to permit blowdown from the coolant loop to enter the reservoir 46. This creates additional steam in the deaerator 48 forcing the steam/liquid interface back up the column 76 until it passes the probe 80; whereupon the blowdown valve 30 is closed. Over a period of time the amount of water condensed from the exhaust stream into the reservoir is equivalent to the amount of make-up water required by the coolant loop. Thus, the rate of blowdown flow into the reservoir is actually a function of the rate at which water is added to the coolant loop from the purification loop.

This method for controlling the amount of blowdown serves two purposes. First, it assures that the appropriate amount of heat is supplied to the deaerator 48 in accordance with the amount of water required to be deaerated; and, second, it provides intermittent blowdown of the recirculating water in sufficient quantities to maintain the level of contaminants in the recirculating cooling water at an acceptable level.

The coolant cleaning system of the exemplary embodiment shown in the drawing includes an optional coolant filter 82 disposed in the coolant loop just upstream of the stack. This filter is a back-up filter to assure that no suspended solid particles pass through the cooler 14.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A coolant cleaning system for a stck of fuel cells in a fuel cell power plant comprising:
    means for providing air as the oxidant to said stack of cells;
    cooler means in heat exchange relationship to said cells;
    coolant loop means for carrying a recirculating flow of water as a coolant through said cooler means wherein at least some of said water is converted to steam;
    means for reacting at least some of said steam with a hydrocarbon fuel to produce hydrogen;
    means for conveying the hydrogen so produced to said stack of cells as the fuel therefor;
    deaerator means for removing dissolved gases from water including a water reservoir;
    means for supplying make-up water to said reservoir, including condenser means, means for introducing oxidant exhausted from said stack of cells into said condenser means, and means for directing water from said condenser means into said water reservoir;
    water purification loop means for removing dissolved and suspended solids from water;
    means for introducing deaerated water from said reservoir into said water purification loop means;
    means for introducing the purified deaerated water from said purification loop means into said coolant loop means at the rate required to replace said steam reacted with said hydrocarbon fuel; and
    means for introducing blowdown from said coolant loop means into said reservoir, including valve means and control means associated with said valve means for opening said valve means to permit blowdown to flow into said reservoir as a function of the rate at which make-up water is required to be added to said coolant loop means.

2. The coolant cleaning system according to claim 1 wherein said water purification loop means includes a charcoal filter and a demineralizer.

3. In a fuel cell power plant including a stack of fuel cells and coolant water circulating within a coolant loop in heat exchange relationship with the stack to cool the stack and to convert at least a portion of the circulating coolant water to steam, a portion of said water being removed from the coolant loop for use elsewhere in the power plant, the process for maintaining the circulating coolant water clean and for providing clean make-up water to said coolant loop comprising the steps of:
    using at least a portion of the steam to process fuel for use in the cells of the stack;
    supplying coolant loop make-up water to a water reservoir by condensing water from at least one of the reactant gas exhaust streams of the stack and conveying the condensed water to the reservoir;

deaerating the water in the water reservoir by heating said water to boiling;

blowing down a portion of the water in the coolant loop and introducing the blowdown into said reservoir to provide at least a portion of the heat for the step of deaerating;

removing a portion of the deaerated water from said reservoir and purifying said removed portion by removing suspended and dissolved solids therefrom; and adding said purified water to the coolant loop at a rate sufficient to maintain the desired rate of coolant flow passing in heat exchange relationship with the stack, wherein the amount of coolant water blown down into the reservoir is a function of the rate at which purified water is added to the coolant loop and is sufficient to maintain an acceptable level of impurities in the circulating coolant water.

4. The process according to claim 3 wherein the step of purifying includes passing the deaerated water through a charcoal filter and a demineralizer.

* * * * *